United States Patent [19]

Ishikawa

[11] Patent Number: 4,524,280
[45] Date of Patent: Jun. 18, 1985

[54] METHOD FOR DETECTING DISPLACEMENT OF SEMICONDUCTOR DEVICE

[75] Inventor: Mitsuaki Ishikawa, Tokyo, Japan

[73] Assignee: Tokyo Shibaura Denki Kabushiki Kaisha, Japan

[21] Appl. No.: 390,033

[22] Filed: Jun. 18, 1982

[30] Foreign Application Priority Data

Jul. 27, 1981 [JP] Japan .................... 56-117432

[51] Int. Cl.$^3$ .................................. G21K 5/10
[52] U.S. Cl. ............................. 250/548; 356/400
[58] Field of Search ............. 250/548, 557, 561; 356/400, 401

[56] References Cited

U.S. PATENT DOCUMENTS

| | | | |
|---|---|---|---|
| 3,989,385 | 11/1976 | Dill et al. ............................. | 250/548 |
| 4,213,117 | 7/1980 | Kembo et al. ........................ | 250/561 |
| 4,315,201 | 2/1982 | Suzuki et al. ....................... | 250/557 |
| 4,328,553 | 5/1982 | Fredriksen et al. ................. | 356/400 |
| 4,406,949 | 9/1983 | Spohnheimer ....................... | 250/561 |

OTHER PUBLICATIONS

"A Fault-Tolerant 64K Dynamic Random-Access Memory", (R. P. Cenker et al.), *IEEE Transactions on Electron Devices*, Vo. ED-26, No. 6, Jun. 1979.

Primary Examiner—David C. Nelms
Assistant Examiner—Jim Gatto
Attorney, Agent, or Firm—Finnegan, Henderson, Farabow, Garrett & Dunner

[57] ABSTRACT

The invention discloses a method for detecting a relative positional relation between the coordinate systems of a semiconductor device such as an IC memory and a laser system for cutting a desired wiring pattern. The detecting method according to this invention comprises the steps of scanning a cross-shaped diffusion layer formed on a silicon wafer with a laser beam in a square shape, detecting a change in a current generated when the laser beam crosses the diffusion layer, defining two points at which the current abruptly increases in the X- and Y-axes of the coordinate system of the wafer, respectively, and calculating a reference point (origin) of the coordinate system of the silicon wafer by calculating an intersection of virtual diagonals of a virtual square the four corners of which correspond to the four points in the X- and Y-axes.

15 Claims, 8 Drawing Figures

F I G. 2
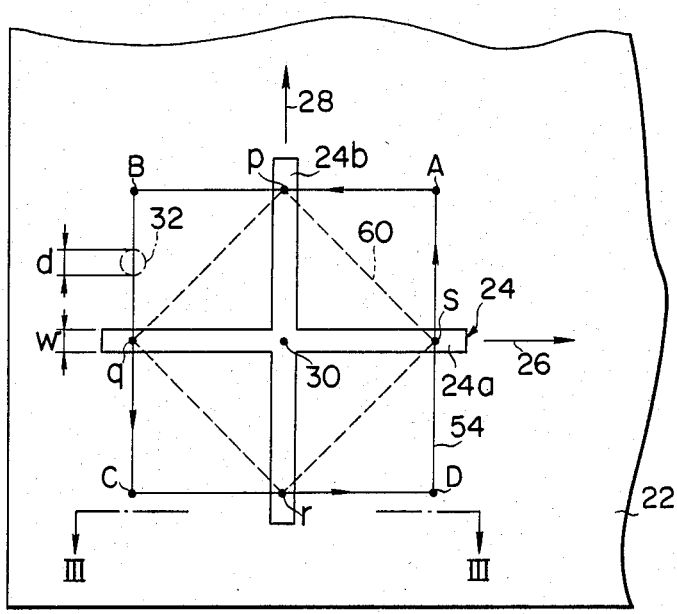
F I G. 3
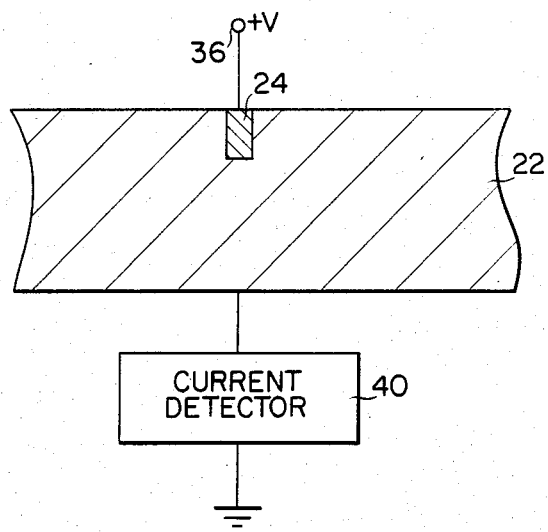

F I G. 7
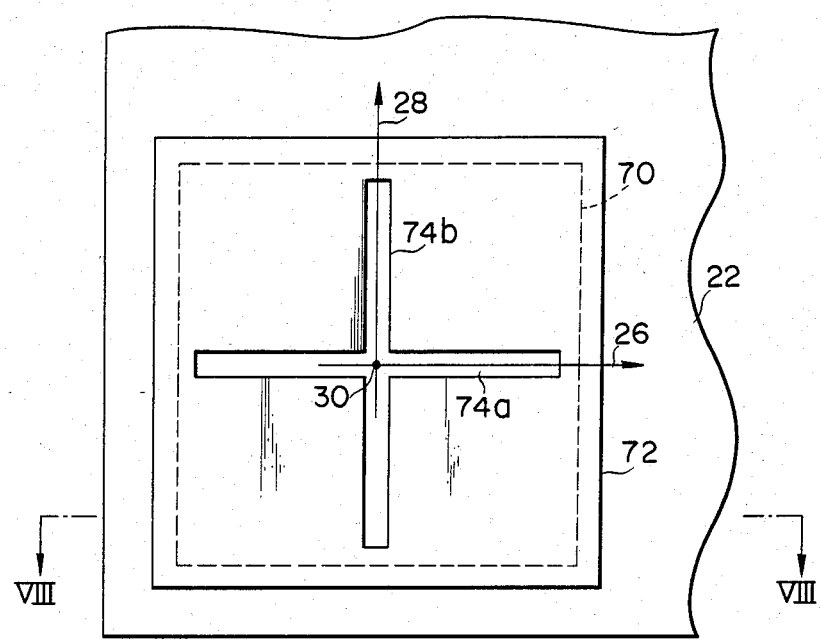
F I G. 8
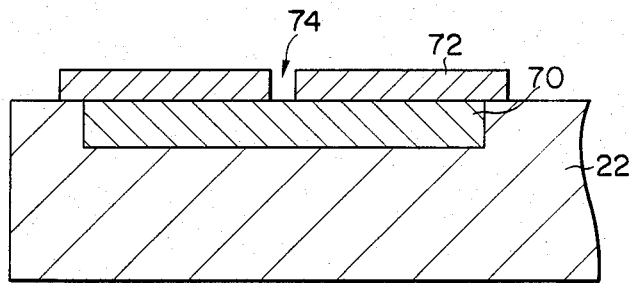

METHOD FOR DETECTING DISPLACEMENT OF SEMICONDUCTOR DEVICE

BACKGROUND OF THE INVENTION

The present invention relates to a method for detecting displacement of a semiconductor device during radiation of an energy beam on a desired portion thereof.

Photoetching is generally used for manufacturing semiconductor devices. With this method, the minimum width of a line to be etched is generally 2 μm. In order to overcome the limitation of the line width, new techniques such as electron beam exposure and X-ray exposure which are not restricted by the wavelength of the light have been developed. With these techniques, conventional element dimensions are reduced greatly and elaborate semiconductor devices are manufactured.

In this manner, when the packaging density of the devices is increased, highly reliable devices of high speed can be manufactured at low cost. However, when the packaging density of the devices is increased, the chip area is increased to cause a decrease in yield of the devices in the manufacturing process. For example, in semiconductor memories such as an IC memory, a redundancy circuit is provided to eliminate defective cells caused by various factors (e.g., dislocation) involved in the manufacturing process and to increase the yield. In the IC memory of this type, a method is used wherein polycrystalline silicon wirings of a defective cell are cut off by an energy beam such as a laser beam and substituted by lines of a spare cell.

In a laser system using the laser beam described above, the coordinate system of the laser beam radiation on the side of the laser system differs from the coordinate system of the polycrystalline silicon wiring on the side of the IC memory. Therefore, it is important that the coordinate systems precisely efficiently correspond with each other and a laser beam is accurately radiated on a desired area of the IC memory.

In order to detect a line to be cut on the IC memory, a reference point or the origin of the coordinate system of a semiconductor substrate (wafer or pellet) is first detected with high precision and the origin is then matched with the origin of the coordinate system of the laser system. That is to say, coordinates of various wiring patterns on the semiconductor substrate are readily determined with reference to the origin of the coordinate system. Data of lines to be cut among the polycrystalline silicon wiring is derived with reference to the origin. If the origin of the coordinate system on the substrate precisely corresponds to that of the coordinate system of the laser beam system, the coordinate system of the substrate is efficiently transformed into the coordinate system of the laser beam system. Therefore, the desired area on the semiconductor substrate can be accurately easily scanned with the laser beam.

However, in the conventional scanning method of this type, satisfactory results can hardly be obtained from the viewpoint of high speed and automatic operation.

SUMMARY OF THE INVENTION

It is an object of the present invention to provide a method for detecting correspondence between a coordinate system of a semiconductor substrate and a coordinate system of radiation of an energy beam such as a laser beam, the detection including a rotational error, with high speed and high precision.

A semiconductor device used in the detecting method of the present invention includes a semiconductive substrate of a first conductivity type and a layer section which has a second conductivity. The layer section is formed in a surface portion of the substrate and defines the coordinate system of the substrate. The layer section of a cross shape has a portion extending in a first direction and another portion extending in a second direction perpendicular to the first direction. An intersection of the portions is defined as the origin of the coordinate system of the substrate.

The substrate is scanned with the energy beam along a predetermined track. A change in a current during laser beam radiation is detected. Points on the beam track which corresponds to the change in the current are then detected. In particular, two points are detected in the first and second directions of the layer section, respectively. Based on data detected as described above, the reference point (origin) of the semiconductor device is calculated. Simultaneously, an angle of angular displacement between the coordinate system of the semiconductor substrate and the coordinate system of the energy beam radiation is also detected.

BRIEF DESCRIPTION OF THE DRAWINGS

FIG. 2 is an enlarged plan view of a cross-shaped diffusion layer in the semiconductor device in FIG. 1;

FIG. 3 is a sectional view along the line III—III of the semiconductor device in FIG. 2;

FIG. 7 is a partially enlarged plan view of a semiconductor device according to a method of still another embodiment of the present invention; and FIG. 8 is a sectional view of the semiconductor device along the line VIII—VIII in FIG. 7.

DETAILED DESCRIPTION OF THE PREFERRED EMBODIMENTS

Figure 1:
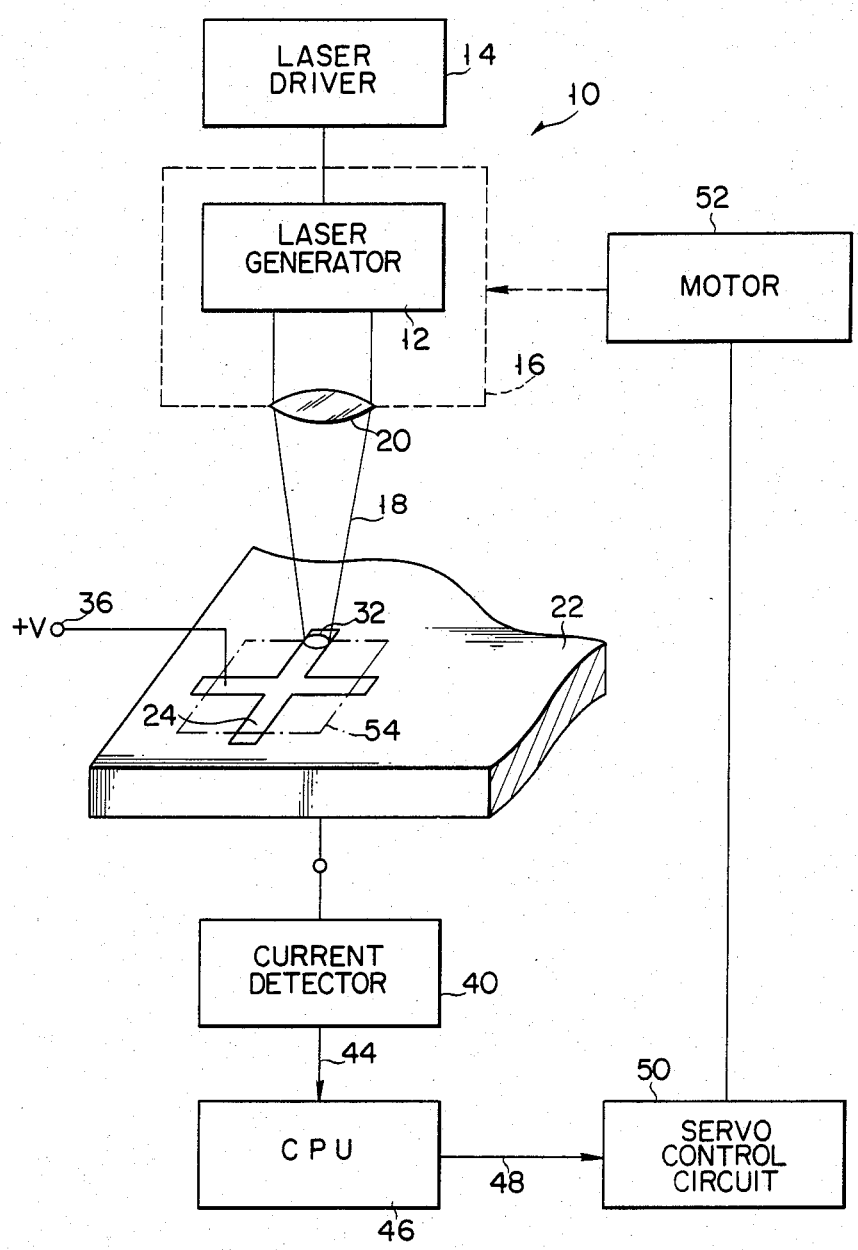
FIG. 1 is a block diagram of the overall arrangement of a semiconductor device to be used with a method according to one embodiment of the present invention and the laser beam radiation system.

Referring now to FIG. 1, there is illustrated therein one form of a laser system 10 according to one embodiment of the present invention. A laser generator 12 is connected to a known laser driver 14. The laser generator 12 is housed in a laser guide housing 16 which is normally called an X-Y stage by persons skilled in the art. A laser beam 18 radiated from the laser generator 12 is focused by a lens 20 on a semiconductive substrate 22 or a p-type silicon wafer placed on a table (not shown).

FIGS. 2 and 3 show the structure of the semiconductive substrate 22 in detail. A diffusion layer 24 is formed in a surface portion of the substrate 22 comprising p-type silicon. The diffusion layer 24 has a conductivity type opposite to that of the substrate 22. An impurity concentration of the diffusion layer 24 is higher than that of the substrate 22.

The n+-type diffusion layer 24 is formed in a cross shape, as shown in FIG. 2. A first extending portion 24a of the diffusion layer 24 linearly extends in correspondence with an X-axis 26 of a coordinate system of the substrate 22. On the other hand, a second extending portion 24b of the diffusion layer 24 linearly extends in correspondence with a Y-axis 28 of the coordinate system of the substrate 22. The second extending portion 24b is substantially formed integrally with the first extending portion 24 and crosses it.

An intersection 30 of the first and second extending portions is defined as a reference point or an origin of the coordinate of the substrate 22. Various patterns (not visible in this figure) such as wiring pattern on the substrate 22 are positioned by the X- and Y-axes 26 and 28 and the origin 30 (intersection of reference point) of the coordinate system. When coordinates (x, y) are plotted along the X- and Y-axes with reference to the origin 30, an arbitrarily pattern located on the substrate 22 can be readily determined.

The first and second extending portions 24a and 24b of the diffusion layer 24 have the same width w. The width w is preferably, substantially determined to be the same as a diameter d of a beam spot 32 focused on the substrate 22. The diffusion layer 24 is connected to a terminal 36. A predetermined positive power source voltage +V is applied to the terminal 36.

The semiconductive substrate 22 is connected to a current detector 40 which includes a known ammeter, for example. The current detector 40 is included in the laser system 10 shown in FIG. 1. The current detector 40 detects a peak current generated in a junction between the substrate 22 and the diffusion layer 24 when the laser beam 18 is radiated on the diffusion layer 24. The current detector 40 then generates a detection signal 44 which is then supplied to a central processing unit (CPU) 46 comprising a microprocessor and so on.

The CPU 46 executes a preset operation program in response to the detection signal 44 from the current detector 40. The CPU 46 then supplies a CPU signal 48 to a servo control circuit 50. The servo control circuit 50 causes a motor 52 to drive the laser guide housing 16. Therefore, the laser beam 18 radiated from the laser generator 12 is focused on the substrate 22 as the beam spot 32. The surface of the substrate 22 is then scanned with the beam spot 32 along a predetermined track 54. In this embodiment, the track 54 of the beam spot 32 is substantially of a square shape, as shown in FIGS. 1 and 2. Each side of the square is shorter than the first and second extending portions 24a and 24b of the diffusion layer 24.

The mode of detection will be described, using the laser system 10 as shown in FIGS. 1 to 3. A positive voltage +V is applied to the cross-shaped diffusion layer 24 in the substrate 22 placed on a table (not shown). The p-n junction between the substrate 22 and the diffusion layer 24 is reverse-biased. The laser beam 18 from the laser generator 12 is focused on a point A on the substrate 22. The point A is, of course, included in the track of the beam spot 32. The beam spot 32 thus focused on the point A is moved toward a predetermined point B along the track 54 of the beam spot 32. The substrate 22 happens to be at the normal position in FIG. 2. The first extending portion 24a of the cross-shaped diffusion layer 24 is substantially parallel to the track 54 of the beam spot 32 which, in turn, crosses part of the second extending portion 24b.

Figure 4:
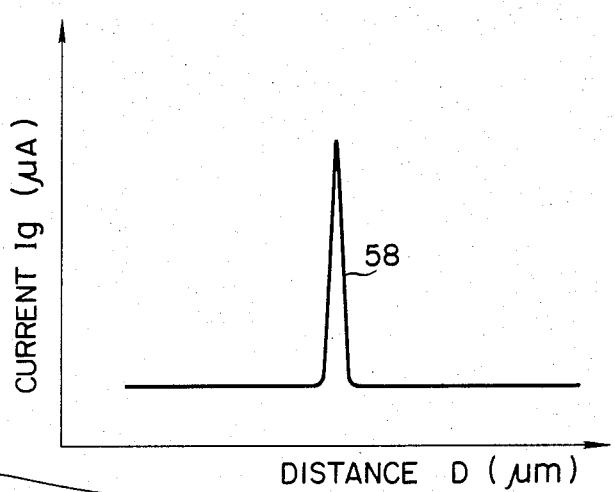
FIG. 4 is a graph showing changes in a current Ig as a function of a distance D when part of the diffusion layer is scanned with a beam spot focused thereon.

Changes in the current Ig generated in the substrate 22 are shown in FIG. 4. When the beam spot 32 is located on the surface of the substrate 22, a very small, constant current (leakage current) flows. However, when the beam spot 32 crosses part of the diffusion layer 24 formed in the substrate 22, the current Ig which abruptly increases as indicated by a curve 58 in FIG. 4 flows through the substrate 22. More particularly, when the part of the diffusion layer 24 is scanned with the beam spot 32, the current Ig is gradually increased. Thereafter, when the beam spot 32 is matched with the diffusion layer 24 since the diameter d of the laser spot 32 is substantially the same as the width w of the diffusion layer 24, the current Ig is maximized.

Since the changes in the current Ig correspond to various positions of the beam spot 32 and are detected by the current detector 40, one central point p of the second extending portion 24b of the cross-shaped diffusion layer 24 is detected by the CPU 46 on the basis of the maximum value of the current Ig. In this case, if the width w of the diffusion layer 24 is smaller than the diameter d of the beam spot 32, the peak value of the current Ig decreases. However, precision of position detecting is improved. On the other hand, if the width w of the diffusion layer 24 is greater than the diameter d of the beam spot 32, the peak value of the current Ig increases and the S/N ratio increases.

The semiconductive substrate 22 is then scanned with the beam spot 32 from the pont B to a point C. A segment BC is perpendicular to a segment AB which connects the points A and B. The segment BC is parallel to the second extending portion 24b of the diffusion layer 24 and crosses part of the first extending portion 24a. In this step, the current Ig produced in the substrate 22 is increased abruptly as shown in FIG. 4 when the beam spot 32 crosses the diffusion layer 24. This change is detected by the current detector 40.

In the same manner as described above, one central point q of the first extending portion 24a is detected. Similarly, the other central point r of the second extending portion 24b and the other central point s of the first extending portion 24a are detected when the substrate 22 is scanned with the beam spot from the point C to a point D and from the point D to the point A, respectively. The beam spot 32 is moved on the substrate 22 along the route of points A, B, C, D and A in accordance with the track 54 determined by the laser system 10. The two peak values of the current Ig are detected, respectively, along the X- and Y-axes of the coordinate system of the substrate 22. As a result, ponts p, q, r and s on the diffusion layer 24 of the n+-type conductivity and the cross shape are detected.

A virtual square 60 based on data of the four points p, q, r and s is formed. A segment pr, which connects two points p and r on the second extending portion extending in the Y-axis 28 on the semiconductor substrate, corresponds to one diagonal of the virtual square 60. Similarly, a segment qs, which connects the two points q and s on the first extending portion 24a extending along the X-axis 26 on the substrate 22, corresponds to the other diagonal of the virtual square 60. By calculating an intersection (not shown) of the two diagonals pr and qs of the virtual square 60, using the CPU 46, the reference point or origin 30 on the substrate 22 is accurately quickly detected. In the conventional method, the origin is calculated manually, resulting in time-consuming operation. However, in the method according to the present invention, the reference point or origin 30 is automatically calculated in a short period of time, for the cross-shaped diffusion layer 24 is scanned once with the laser beam 18.

Further, since a segment DA of the track 54 of the laser spot 32 is perpendicular to the diagonal qs which connects the points q and s of the first extending portion 24a of the diffusion layer 24, the correspondence between the coordinate system of the substrate 22 with that of the laser system 10 is easily checked. Therefore, the position of an arbitrary wiring pattern (not shown) on the semiconductor substrate can be simply determined with reference to the reference point or origin 30. When a defective IC memory is found, the laser beam 18 is radiated on a corresponding line of the memory wafer. This line is thus cut off and substituted by the line of the space cell immediately.

Figure 5:
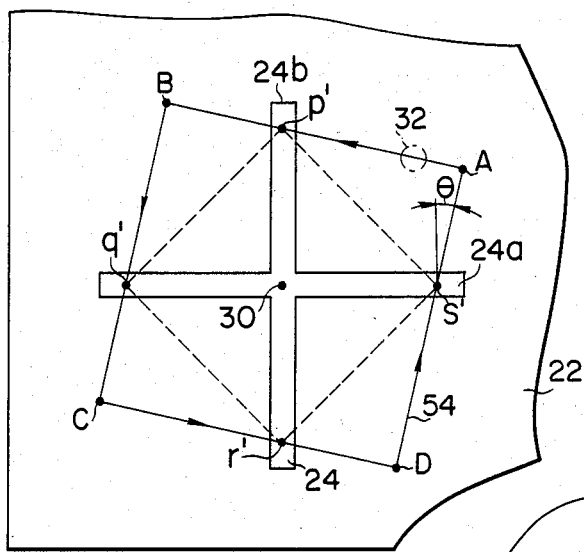
FIG. 5 is a view of the track of the beam spot when the semiconductor device shown in FIGS. 2 and 3 is displaced by an angle θ from the normal position.

FIG. 5 shows the substrate 22 which is misaligned from the normal position and placed on a table (not shown) of the laser system 10 shown in FIG. 1. The beam spot 32 focused on the substrate 22 is sequentially moved in the order of the points A, B, C, D and A along the track 54. Four points p', q', r' and S' are detected on the cross-shaped diffusion layer 24. When an intersection of a segment p'r' and a segment q's' is then determined, the reference point or origin 30 is accurately detected. Further, as shown in FIG. 5, the segment DA included in the track 54 of the beam spot 32 and the segment q's' connecting the two points q' and s' of the first extending portion 24a of the cross-shaped diffusion layer 24 are not perpendicular to each other but misaligned by an angle $\theta$. By detecting the angle $\theta$, it is detected that the coordinate system of the substrate 22 is angularly misaligned by the angle $\theta$ from the coordinate system of the laser system 10. One of the coordinate system is rotated by the angle $\theta$ to be aligned with the other coordinate system.

The relative positional relation between the coordinate systems of the substrate 22 and the laser system 10 can be accurately quickly obtained. Therefore, if the substrate 22 is scanned with the laser beam 18 based on the reference point or the origin and the relative positional relation, only a desired line of the defective cell of the semiconductor device such as the IC memory is cut off with high precision, preventing thermal influence to other cells. As a result, time for eliminating the defective cell and substituting it with a space cell is shortened, thus improving the yield of the semiconductor devices.

Figure 6:
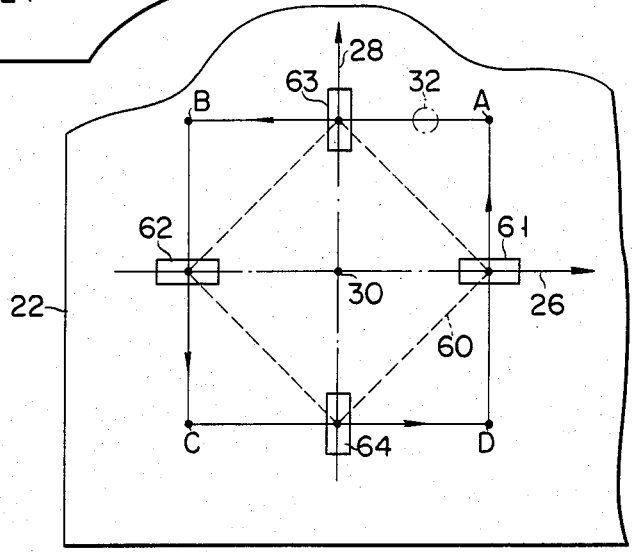
FIG. 6 is a partially enlarged plan view of a semiconductor device according to a method of another embodiment of the present invention.

Referring to FIG. 6, there is illustrated another embodiment of a diffusion layer formed in the semiconductor device of the present invention. In the second embodiment, four $n^+$-type diffusion layer components 61, 62, 63 and 64 are separately formed in a surface layer of the substrate 22. The two diffusion layer components 61 and 62 are aligned along the X-axis 26 on the coordinate system of the substrate 22. The other two diffusion layer components 63 and 64 are aligned along the Y-axis. The diffusion layer components 61, 62, 63 and 64 are preferably equally spaced apart from the reference point or origin 30.

With the semiconductor device having the above diffusion layer components, the reference point of the substrate 22 can be easily obtained. This reference point (origin) and the X- and Y-axes can be easily made to correspond to the origin and the X- and Y-axes of the coordinate system of the laser system.

Referring to FIGS. 7 and 8, there is shown still another embodiment of a semiconductor device according to the present invention. An $n^+$-type diffusion layer 70 is formed in a surface of the p-type substrate 22. The diffusion layer 70 is of a square shape, for example. A metal layer 72 made of aluminum or the like is formed on the substrate 22. The metal layer 72 prevents transmission of the laser beam 18 and shields the laser beam 18. The metal layer 72 has an opening 74 of a cross shape. The opening 74 consists of first and second opening portions 74a and 74b extending along the X- and Y-axes of the coordinate system of the substrate 22. An intersection of the first and second opening portions 74a and 74b is defined as the reference point or origin 30 of the substrate 22.

When the semiconductor device with the above arrangement is scanned with the beam spot 32 as shown in FIG. 2, the same effects as shown in FIGS. 1 to 3 can be obtained. The edge of the opening 74 of the metal layer 72 which covers the $n^+$-type diffusion layer 70 is sharp. Therefore, changes in the current Ig produced when the beam spot 32 as shown in FIG. 2 crosses the opening 74 are more apparently detected. The detection of the reference point or origin 30 is further improved.

Although the present invention has been shown and described with respect to particular embodiments, nevertheless, various changes and modifications which are obvious to a person skilled in the art to which the invention pertains are deemed to lie within the spirit, scope, and contemplation of the invention. For example, the semiconductor device may not be limited to a silicon wafer which has a diffusion layer the conductivity type of which is different from that of the wafer. The diffusion layer may be formed in the chip. Further, when a silicon wafer is used, the diffusion layer may be formed in every chip of the wafer. The diffusion layers may be formed in a region within the chip such as a scribing line region.

What is claimed is:

1. A method for detecting a relative positional relation and rotational error between a predetermined coordinate system of a semiconductor device and a coordinate system of an energy beam apparatus when an energy beam is radiated onto a desired portion of said semiconductor device, said method comprising the steps of:

scanning a single substantially cross-shaped semiconductive layer, having a second semiconductor type and preformed on the top of a semiconductor device having a substrate of a first conductivity type, with said energy beam spotted on said semiconductor device once along a rectangular closed scanning loop, said semiconductive layer having first and second layer portions substantially overlapping each other to define the coordinate system of said substrate and an intersection thereof corresponding to a reference point of said substrate;

detecting a change in a current generated when said energy beam crosses said semiconductive layer of said semiconductor device;

detecting four points at which the current abruptly changes and which correspond to four beam crossing points produced two each at said first and second layer portions of said semiconductive layer; and calculating said reference point of said semiconductor device and an angular displacement of the coordinate system of said semiconductor substrate from the coordinate system of said energy beam apparatus, based on data including said four points.

2. A method according to claim 1, wherein said reference point of said substrate is calculated by an intersection of a virtual line connecting said two points at which the current changes on said first layer portion and a virtual line connecting said two points at which the current changes on said second layer portion.

3. A method according to claim 2, further comprising the step of forming said first and second layer portions in first and second directions substantially perpendicular to each other which correspond to the X- and Y-axes of the orthogonal coordinate system of said substrate, respectively.

4. A method according to claim 3, further comprising the step of setting said semiconductor device having said substrate and said layer mens in a reverse-biased state.

5. A method according to claim 4, further comprising the steps of forming said semiconductor layer as a cross-shaped diffusion layer having a first portion extending in said first direction and a second portion extending in the second direction, and forming said second portion integrally with said first portion.

6. A method according to claim 4, further comprising the steps of forming said semiconductor layer to include at least two diffusion layers which are substantially equally spaced apart from said reference point aong said first direction, and at least two diffusion layers which are substantially equally spaced apart from said reference point along said second direction.

7. A method according to claim 4, further comprising the steps of forming said semiconductor layer as a diffusion layer formed in the surface portion of said substrate, and providing a layer on the surface portion of said substrate to cover said diffusion layer, which has a cross-shaped opening extending in said first and second directions, and which is made of a material which prevents transmission of the energy beam.

8. A method according to claim 1, wherein the change in the current is detected on an increase in a current generated between said substrate and said semiconductor layer upon radiation of the energy beam.

9. A method according to claim 1, wherein said energy beam radiation is performed by scanning said substrate with a laser beam, the laser beam being moved along a square track which is so set as to include the reference point therein and crosses said semiconductor layer at four points thereof.

10. A method according to claim 8 or 9, wherein said energy radiation is performed by a laser beam.

11. A method according to claim 1, wherein said point detecting step comprises the step of scanning said semiconductive layer only once with said energy beam spot along said rectangular closed scanning loop, which surrounds said intersection and the length of each side of said rectangular loop is shorter than the lengths of said first and second layer portions, in order to detect both said relative positional relation and rotational error.

12. A method according to claim 11, wherein said calculating step comprises the step of detecting, as said rotational error, an angle between one side of said closed scanning loop, which intersects one of said first and second layer portions of said semiconductive layer, and a line substantially perpendicular to said one of said first and second layer portions.

13. A method according to claim 12, wherein said step of scanning said semiconductive layer only once comprises the steps of:
irradiating said energy beam so as to form on said substrate said beam spot having a diameter substantially equal to the width of said semiconductive layer; and
moving a beam generator included in said energy beam apparatus so as to allow said beam spot to move along a substantially square closed scanning loop.

14. A method according to claim 12, wherein said step of scanning said semiconductive layer only once comprises the steps of:
irradiating said energy beam so as to form on said substrate said beam spot having a diameter smaller than the width of said semiconductive layer; and
moving a beam generator included in said energy beam apparatus so as to allow said beam spot to move along a substantially square closed scanning loop.

15. A method according to claim 12, wherein said step of scanning said semiconductive layer only once comprises the steps of:
irradiating said energy beam so as to form on said substrate said beam spot having a diameter greater than the width of said semiconductive layer; and
moving a beam generator included in said energy beam apparatus so as to allow said beam spot to move along a substantially square closed scanning loop.

* * * * *